United States Patent
Sato et al.

(10) Patent No.: US 7,069,809 B2
(45) Date of Patent: Jul. 4, 2006

(54) VEHICLE TILT TYPE STEERING DEVICE

(75) Inventors: Kenji Sato, Gunma-ken (JP); Yasuhiro Shibuya, Gunma-ken (JP)

(73) Assignee: NSK, Ltd., Tokyo (JP)

( * ) Notice: Subject to any disclaimer, the term of this patent is extended or adjusted under 35 U.S.C. 154(b) by 313 days.

(21) Appl. No.: 10/469,009

(22) PCT Filed: Dec. 25, 2002

(86) PCT No.: PCT/JP02/13507

§ 371 (c)(1),
(2), (4) Date: Aug. 26, 2003

(87) PCT Pub. No.: WO03/055730

PCT Pub. Date: Jul. 10, 2003

(65) Prior Publication Data

US 2004/0237695 A1  Dec. 2, 2004

(30) Foreign Application Priority Data

Dec. 27, 2001 (JP) ............................. 2001-398469
Dec. 27, 2001 (JP) ............................. 2001-398473
Oct. 25, 2002 (JP) ............................. 2002-311506

(51) Int. Cl.
*B62D 1/18* (2006.01)
(52) U.S. Cl. ........................... 74/493; 280/775
(58) Field of Classification Search .................. 74/493, 74/388 PS; 280/775, 779
See application file for complete search history.

(56) References Cited

U.S. PATENT DOCUMENTS 4,594,909 A * 6/1986 Yamaguchi .................. 74/493
5,168,768 A * 12/1992 Easton ........................ 74/493
5,452,624 A * 9/1995 Thomas et al. ............... 74/493
5,899,497 A * 5/1999 Spencer et al. ............. 280/775
6,282,977 B1 * 9/2001 Satoh et al. .................. 74/493

FOREIGN PATENT DOCUMENTS

| JP | UM 59-146267 | 9/1984 |
| JP | UM 60-179575 | 11/1985 |
| JP | 62-110566 | 5/1987 |
| JP | UM 63-51868 | 4/1988 |
| JP | UM 63-189877 | 12/1988 |
| JP | UM 3-40164 | 4/1991 |
| JP | UM 5-54148 | 7/1993 |
| JP | 5-319277 | 12/1993 |

(Continued)

*Primary Examiner*—Richard W. Ridley
*Assistant Examiner*—Justin Krause
(74) *Attorney, Agent, or Firm*—Miles & Stockbridge P.C.

(57) ABSTRACT

A tilt adjustable type steering apparatus for a vehicle is constructed such that a rear column member is connected in a swayable manner within an on-driving tilt adjustable range to a front column member fixed to a car body, a fixed gear provided on one of the front column member and the rear column member is engaged with a movable gear provided on the other of the front column member and the rear column member when fixing the rear column member to a tilt adjusted position, and the two fixed and movable gears are disengaged from each other by swaying the movable gear when releasing the rear column member from the tilt adjusted position. The same apparatus includes a spring and/or a lock mechanism, which enables the rear column member to be tilted up to an upper predetermined position in excess of the on-driving tilt adjustable range and holds in this position the rear column member tilted up to the predetermined position.

13 Claims, 6 Drawing Sheets

FOREIGN PATENT DOCUMENTS

| | | |
|---|---|---|
| JP | UM 6-1107 | 1/1994 |
| JP | UM 6-8148 | 2/1994 |
| JP | UM 6-42521 | 6/1994 |
| JP | 11-198821 | 7/1999 |
| JP | 2000-255435 | 9/2000 |
| JP | 2000-272524 | 10/2000 |

* cited by examiner

VEHICLE TILT TYPE STEERING DEVICE

TECHNICAL FIELD

The present invention relates to a tilt type steering apparatus for a vehicle, which is capable of adjusting a tilt of a steering wheel within a range in which the tilt for the time of driving the vehicle is adjustable (which will hereinafter be simply termed an on-driving tilt adjustable range) and is, besides, capable of tilting through a large angle in excess of this on-driving tilt adjustable range.

BACKGROUND ART

A tilt type steering apparatus capable of adjusting a tilt angle of a steering wheel, corresponding to a physique, a driving posture, etc. of a driver is, as disclosed in, e.g., Japanese Patent Application Laid-Open Publication No.11-198821, constructed such that a rear column member is so connected in a swayable manner to a rear side end of a front column member fixed to a car body (which is a so-called swing tilt).

When fastening the rear column member to a tilt adjusted position, a movable gear of the rear column member is biased to engage with a fixed gear of the front column member on one hand, and, when releasing the rear column member from the tilt adjusted position, the engagement of the two gears is canceled by rotating the movable gear resisting a biasing force on the other hand.

Further, when adjusting a tilt of the rear column member, a swayable range of the rear column member falls within the on-driving tilt adjustable range suited to the driving of a vehicle, and is generally approximately ±10 degrees.

By the way, there has been recently an increase in demands for RVs (Recreational Vehicles), and the utilization of the vehicles has also been diversified. For example, a family has a meal in a car room, the RV substitutes for a tent in camping, and so forth.

On this occasion, the steering wheel is raised through a large angle and thus retreated, and then a driver's seat is rotated and directed backwards, thus forming a comparatively large effective utility space.

DISCLOSURE OF THE INVENTION

It is an object of the present invention to provide a tilt adjustable type steering apparatus for a vehicle that is capable of surely, when a steering wheel is tilted up through a large angle, holding the steering wheel in this position.

To accomplish the above object, according to a first mode of the present invention, in a tilt adjustable type steering apparatus for a vehicle, constructed such that a rear column member is connected in a swayable manner within an on-driving tilt adjustable range to a front column member fixed to a car body, a fixed gear provided on one of the front column member and the rear column member is engaged with a movable gear provided on the other of the front column member and the rear column member when the rear column member is fixed to a tilt adjusted position, and the two fixed and movable gears are disengaged from each other by swaying the movable gear when the rear column member is released from the tilt adjusted position, there is provided an improvement characterized in that a tension spring for a large angle tilt-up which elastically pulls the rear column member when the rear column member is tilted up through a large angle in excess of the on-driving tilt adjustable range, is disposed between the front column member and the rear column member. In the tilt adjustable type steering apparatus for the vehicle according to the first mode of the present invention, it is preferable that the tension spring for the large angle tilt-up is disposed so that when the rear column member is set in a neutral position of the on-driving tilt adjustable range a central line of the tension spring extends through a tilt center or through the vicinity thereof as viewed from a side of steering apparatus. According to this configuration, the tension spring for the large angle tilt-up, which elastically pulls the rear column member when the rear column member is tilted up through the large angle in excess of the on-driving tilt adjustable range, is interposed between the front column member and the rear column member. This tension spring, when setting the rear column member in a neutral position of the on-driving tilt adjustable range, is disposed so that its central line is substantially parallel with an axial line of a steering shaft and extends through a tilt center or sideways of the vicinity thereof. Therefore, the large angle tilt-up tension spring does not exhibit the elastic tension force in the normal on-driving tilt adjustable range and, only when the rear column member is tilted up through the large angle, offsets the central line thereof from the tilt center, elastically pulls the rear column member and retains state of tilting up the rear column member. Accordingly, the steering wheel, when tilted up through the large angle, can be surely held in that position.

Further, to accomplish the above object, according to a second mode of the present invention, in a tilt adjustable type steering apparatus for a vehicle, constructed such that a rear column member is connected in a swayable manner within an on-driving tilt adjustable range to a front column member fixed to a car body, a fixed gear provided on one of the front column member and the rear column member is engaged with a movable gear provided on the other of the front column member and the rear column member when the rear column member is fixed to a tilt adjusted position, and the two fixed and movable gears are disengaged from each other by rotating the movable gear when the rear column member is released from the tilt adjusted position, there is provided an improvement characterized in that the movable gear is so constructed that its front side end portion is engaged with a side end portion of the fixed gear and thus locked when the rear column member is tilted up through a large angle in excess of the on-driving tilt adjustable range.

As described above, according to the second mode of the present invention, when the rear column member is tilted up through the large angle, the movable gear operates so that its side end surface is engaged with the side end surface of the fixed gear and thus locked. Therefore, the steering wheel can be surely held unmovable in that position even if there is applied a load that is as large as the driver's hanging on to the steering wheel and so forth.

In the tilt adjustable type steering apparatus for the vehicle according to the second mode of the present invention, it is preferable that the fixed gear and the movable gear respectively have teeth portions meshing with each other in the on-driving tilt adjustable range, and the fixed gear has a non-teeth area formed with no tooth, adjacent to the teeth portion thereof. With this configuration, the steering shaft is not locked other than in the tilt adjustable area, and hence there is no possibility in which the driver drives the vehicle in an improper tilt position.

Moreover, in the tilt adjustable type steering apparatus for the vehicle according to the present invention, it is preferable that a joint that connects the rear column member to the front column member in a swayable manner about the tilt center, enables the rear column member to bend at a large angle. With this contrivance, the large angle tilt-up can be attained in any rotational phase of the steering wheel by, for example, elongating arms of a yoke of a universal joint.

Further, in the tilt adjustable type steering apparatus for the vehicle according to the second mode, the locking means, when the rear column member is tilted up through the large angle in excess of the on-driving tilt adjustable range, holds the rear column member in that tilt-up position. Hence, as a means for holding the rear column member when tilted up, for instance, there is no necessity of engaging the movable gear with the fixed gear and locking them, whereby the structure can be simplified.

THE EMBODIMENTS OF THE INVENTION

A tilt type steering apparatus for a vehicle of embodiments of the present invention will hereinafter be described with reference to the accompanying drawings.

(First Embodiment)

Figure 1:
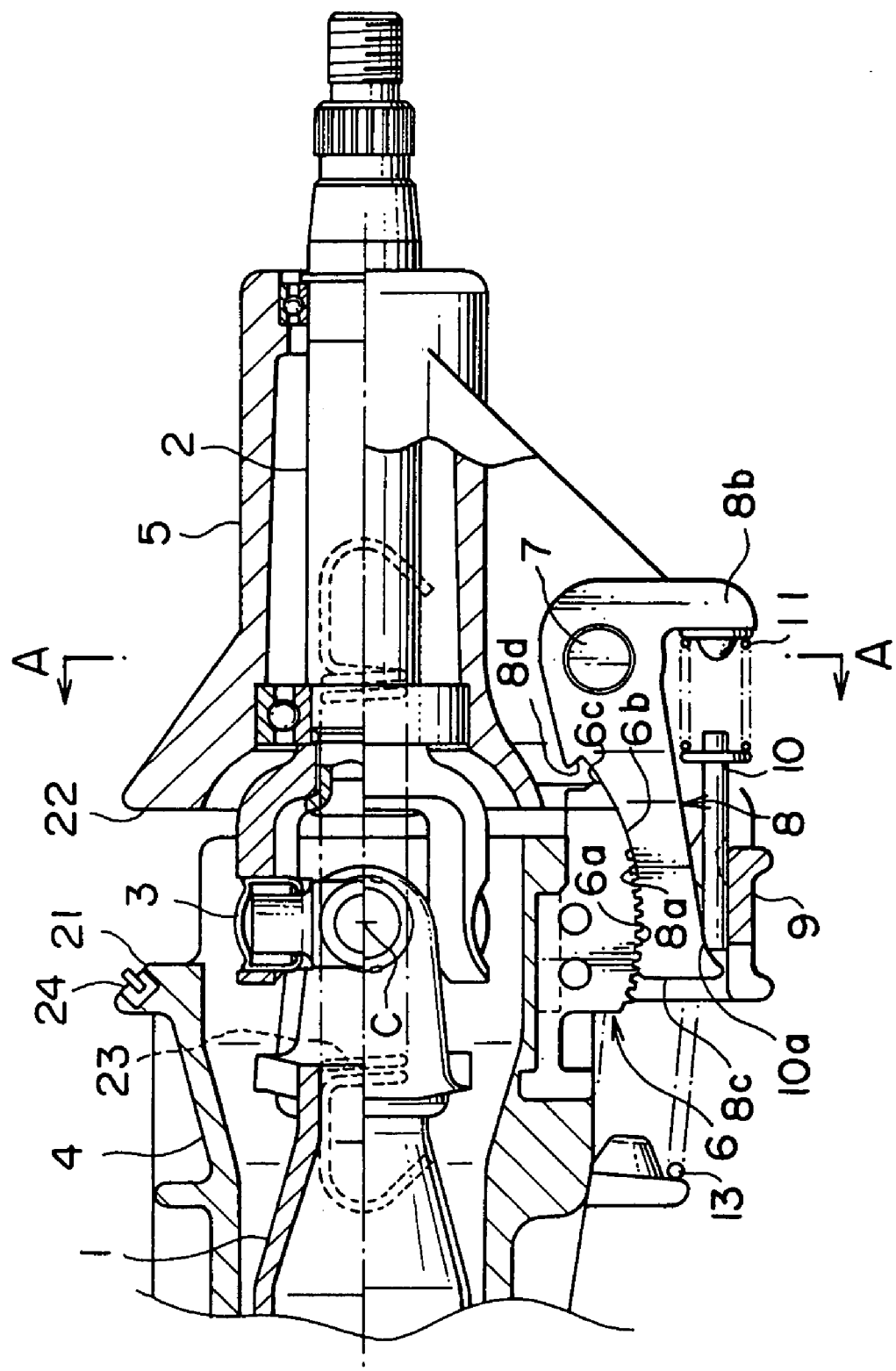
FIG. 1 is a vertical sectional view of a tilt adjustable type steering apparatus for a vehicle of a first embodiment of the present invention.
Figure 2:
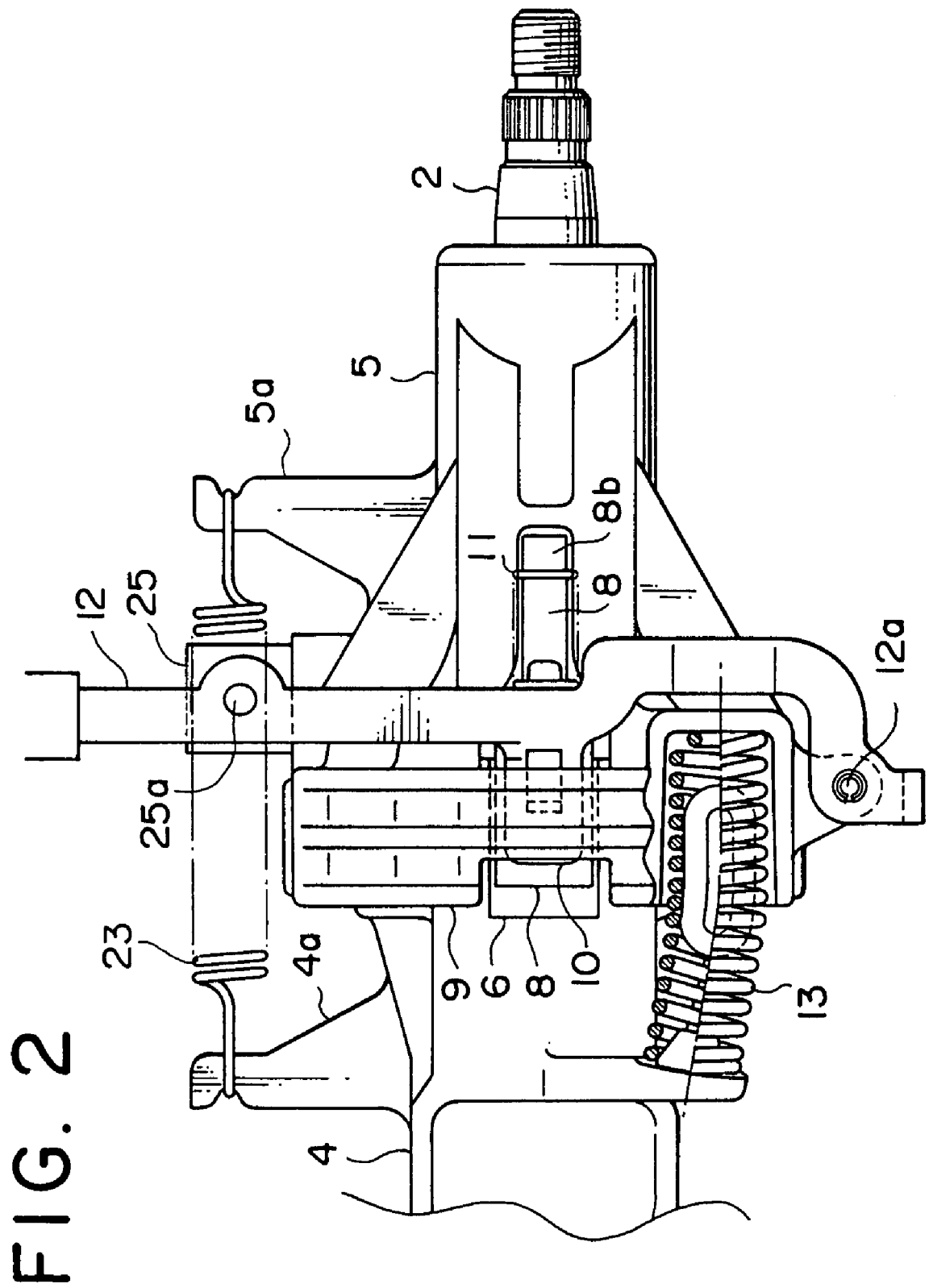
FIG. 2 is a bottom view of the tilt adjustable type steering apparatus for the vehicle shown in FIG. 1.
Figure 3:
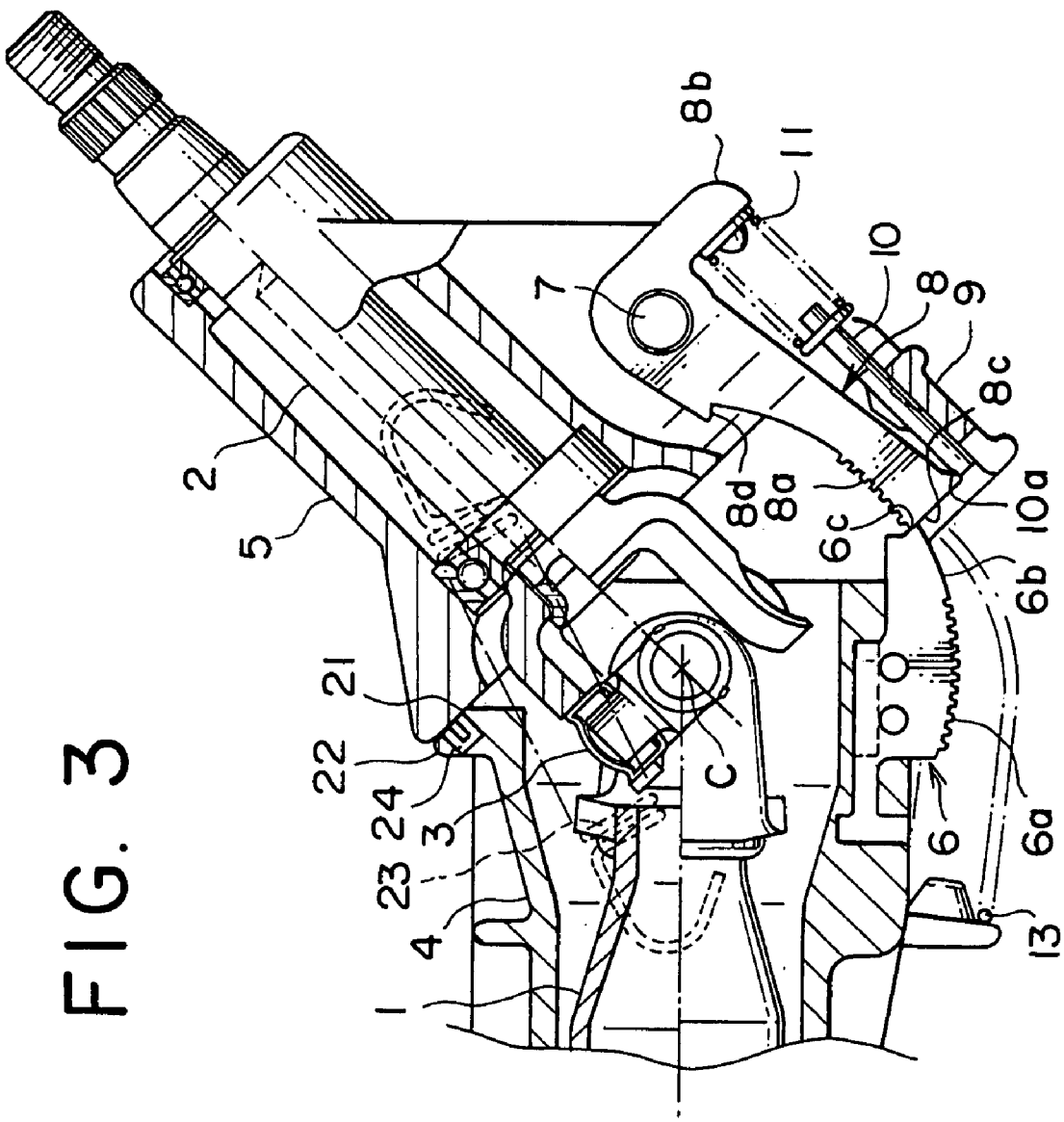
FIG. 3 is a vertical sectional view of the tilt adjustable type steering apparatus for the vehicle shown in FIG. 1, showing a state where a rear column member is tilted up through a large angle in excess of an on-driving tilt adjustable range.
Figure 4:
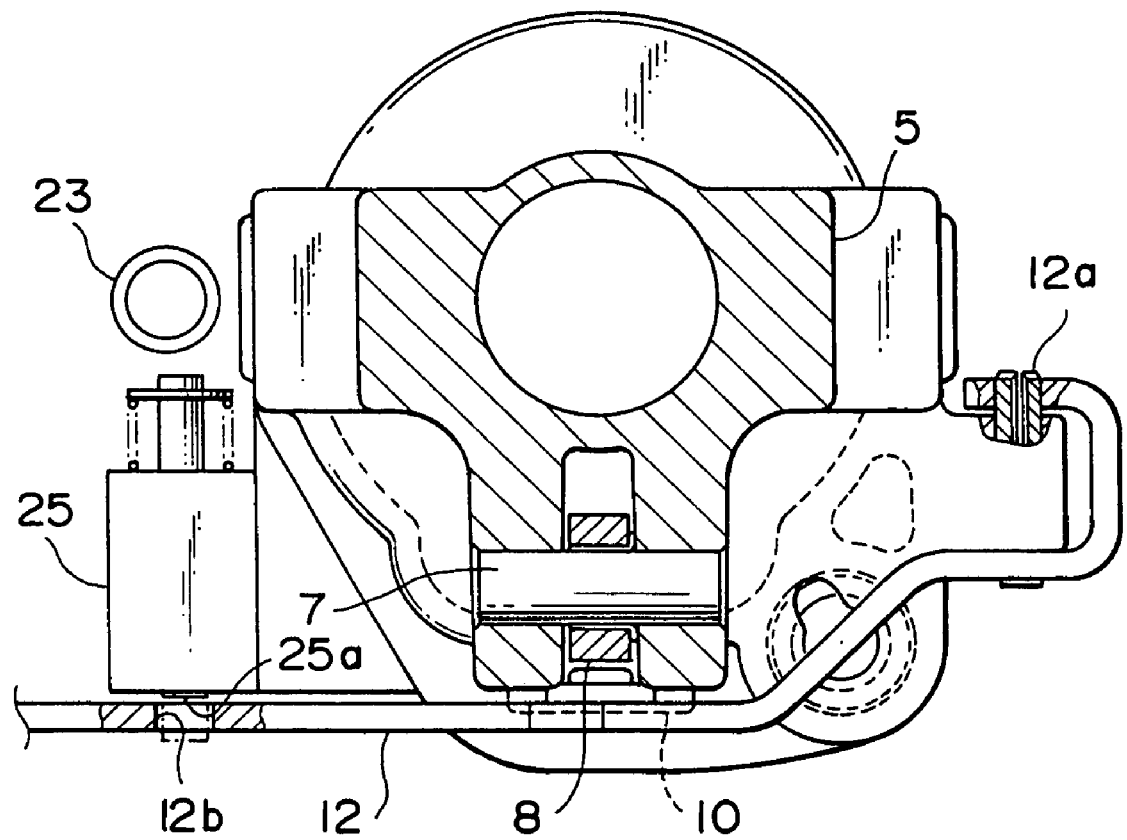
FIG. 4 is a cross sectional view taken along the line A—A in FIG. 1.

FIG. 1 is a vertical sectional view showing the tilt adjustable type steering apparatus for the vehicle of a first embodiment of the present invention. FIG. 2 is a bottom view of the tilt adjustable type steering apparatus for the vehicle shown in FIG. 1. FIG. 3 is a vertical sectional view of the tilt adjustable type steering apparatus for the vehicle shown in FIG. 1, showing a state where a rear column member is tilted up through a large angle in excess of an on-driving tilt adjustable range. FIG. 4 is a cross sectional view taken along the line A—A in FIG. 1.

A steering shaft is divided into a front steering shaft 1 connected via an intermediate shaft coupling, etc. to a steering gear mechanism (unillustrated) of the vehicle, and into a rear steering shaft 2 with its rear side end fixedly provided with a steering wheel (unillustrated), these shafts being connected by a universal joint 3. The front steering shaft 1 and the rear steering shaft 2 are rotatably accommodated in a front column member 4 and a rear column member 5, respectively.

The rear column member 5 is connected in a swayable manner to a rear portion of the front column member 4 fixed to the car body and is swayable within an on-driving tilt adjustable range (approximately ±10 degrees) about a tilt center C. Note that the tilt center C is concentric with the universal joint 3.

A fixed gear 6 having a gear teeth portion 6a is fixed to an undersurface of the front column member 4. A movable gear 8 having a gear teeth portion 8a meshing with the gear teeth portion 6a of the fixed gear 6 is pivotally supported in the swayable manner around on a pivot 7 provided in the rear column member 5. Note that the respective gear teeth portions 6a, 8a are arranged circularly around the tilt center C.

A reaction member 9 integral with the rear column member 5 is extended in a car-widthwise direction downwardly of the movable gear 8 (see FIG. 2). A wedge-shaped member 10 having a press tapered surface 10a for pressing a rear tapered surface of the movable gear 8 in a way that abuts on and presses the rear tapered surface of the movable gear 8, is so disposed as to be movable in back-and-forth directions between the movable gear 8 and the reaction member 9.

A press spring (a compression spring) 11 is interposed between a rear side end of the wedge-shaped member 10 and a rear extended piece 8b extending from the movable gear 8. The press spring (the compression spring) 11 always biases the gear teeth portion 8a of the movable gear 8 in such a direction that the gear teeth portion 8a of the movable gear 8 and the gear teeth portion 6a of the fixed gear 6 mesh with each other. The press spring (the compression spring) 11 has a function of biasing the movable gear 8 through the extended piece 8b in a releasing direction (counterclockwise in FIG. 1) also when releasing the rear column member 5 from being fixed to the tilt position.

As shown in FIG. 2, a tilt adjusting lever 12 is formed integrally with the wedge-shaped member 10 and extends on both sides of the rear portion of the wedge-shaped member 10. The tilt adjusting lever 12 is swayable about a center-of-rotation-of-lever pin 12a provided on the rear column member 5.

As illustrated also in FIG. 2, a first support spring (a compression spring) 13 is interposed between the front column member 4 and the rear column member 5. This configuration prevents descents of the rear column member 5, the steering wheel, etc. when the two gears 6, 8 are disengaged from each other. A side end surface 8d of the movable gear 8 functions, when the rear column member 5 is in the lowest tilt position, as a stopper that abuts on the side end surface 6c of the fixed gear 6.

In the thus constructed tilt adjustable type steering apparatus, when making the tilt adjustment, the tilt adjusting lever 12 is swayed backwards (FIG. 2) of the vehicle by a hand, resisting the biasing force of the press spring (the compression spring) 11, thereby retreating the wedge-shaped member 10 backwards (FIG. 1).

As a result, the movable gear 8 is assisted by the biasing force of the press spring (the compression spring) 11 and is thereby rotated counterclockwise about the pivot 7 in FIG. 1, thus canceling the engagement with the fixed gear 6. This enables the rear column member 5 to release from being fixed to the tilt adjusted position.

The tilt adjustment is performed in a way that tilts the rear column member 5 within the on-driving tilt adjustable range (approximately ±10 degrees) suited to the driving of the vehicle.

Upon detachment of the tilt adjusting lever 12 after making the tilt adjustment of the rear column member 5, the tilt adjusting lever 12 is swayed forwards (FIG. 2) of the vehicle with the assistance of the biasing force of the press spring (the compression spring) 11, thereby moving the wedge-shaped member 10 forwards (FIG. 1).

As a result, the movable gear 8, with its gear teeth portion 8a being pressed against the gear teeth portion 6a of the fixed gear 6 by dint of the wedge-shaped member 10 biased by the press spring (the compression spring) 11, firmly meshes with the fixed gear 6. This makes it possible to fasten the rear column member 5 to the tilt position.

Given next is an explanation of a case of tilting up (tilt-up) the rear column member through a large angle in excess of the on-driving tilt adjustable range.

In the first embodiment, as illustrated in FIG. 3, the universal joint 3 connecting the front steering shaft 1 and the rear steering shaft 2 together so as to be swayable about the tilt center C, is constructed such that the rear column member 5 can be, for instance, bent through up to approximately 60 degrees.

With this construction, when the vehicle is parked, the rear column member 5 can be tilted up through a large angle (e.g., 50 degrees) exceeding the on-driving tilt adjustable range (approximately ±10 degrees).

When the fixation of the rear column member 5 to the tilt position is canceled by pulling the tilt lever 12 backwards of the vehicle by the hand, the rear column member 5 starts being tilted up by the first support spring 13.

As shown in FIG. 3, when the rear column member 5 is tilted up through the large angle, a contrivance is that a front side end support seat portion (a tilt-up stopper) 22 formed on the rear column member 5 abuts on a rear side end support seat portion (a tilt-up stopper) 21 formed on the front column member 4.

The fixed gear 6 has a non-teeth area 6b formed with none of teeth, adjacent to the gear teeth portion 6a thereof. The movable gear 8 is structured so that a side end surface Bc thereof is engaged with a side end surface 6c of the fixed gear 6 by the biasing force of the press spring (the compression spring) 11 and thus locked.

With this configuration, till the tilt-up of the rear column member 5 is started and then completed, the movable gear 8 moves while its gear teeth portion 8a slides on the non-teeth area 6b of the fixed gear 6. Thereafter, as shown in FIG. 3, when the tilt-up through the large angle is completed, the movable gear 8 operates such that the gear teeth portion 8a thereof separates from the non-teeth area 6a, while its side end surface 8c is engaged with the side end surface 6c of the fixed gear 6 and thus locked.

As illustrated in FIGS. 2 and 3, a second support spring (a tension spring) 23 for the tilt-up through the large-angle is interposed between a support piece 4a formed on the front column member 4 and a support piece 5a formed on the rear column member 5.

As shown in FIG. 1, the second support spring (the tension spring) 23 is disposed so that, when the rear column member 5 is set in such a neutral position where a front column axial line and a rear column axial line in the on-driving tilt adjustable range (approximately ±10 degrees) are coincident with each other, the central line of the second support spring 23 is substantially parallel with the axial line of the steering shafts 1, 2 and extends through the tilt center C or in the vicinity thereof as viewed from the back.

With this configuration, the second support spring (the tension spring) 23 does not exhibit an elastic tension force in the normal on-driving tilt adjustable range, and, as shown in FIG. 3, only when tilted up through the large angle exceeding the on-driving tilt adjustable range, offsets the center line thereof from the tilt center and elastically pulls and tilts the rear column member 4 up (counterclockwise, i.e., in such a direction as to raising the rear column member 5), whereby the rear column member 5 can thus be held in a tilt-up completed position. Accordingly, the steering wheel is tilted up through the large angle and can be surely held in this position.

Note that the first support spring (the compression spring) 13 is, because of a large quantity of movement of the rear column member, hard to retain a tilt-up force up to the uppermost position of the rear column member, however, the tension force of the second support spring 23 acts and tilts the rear column member up in an upper position.

The rear end support seat portion (the tilt-up stopper) 21 of the front column member 4 is provided with a large angle tilt-up sensor (a large angle tilt-up detecting means) 24 for detecting that the front end support seat portion (the tilt-up stopper) 22 of the rear column member 5 abuts on the rear end support seat portion 21 thereof.

When the large angle tilt-up sensor 24 functions, a speed-change shift is locked at a parking range (P), with the result that the vehicle becomes unable to travel. An engine is, however, structured to operate.

Note that if the large angle tilt-up sensor (the large angle tilt-up detecting means) 24 is provided in other position and so on, when the front end support seat portion (the tilt-up stopper) 22 of the rear column member 5 abuts on the rear end support seat portion (the tilt-up stopper) 21 of the front column member 4, an impact absorbing member for absorbing an impact, etc. caused by this abutment may also be disposed in that position of the sensor 24.

In the case of detecting a vehicle travelable state such as a release from a parking brake, a shift-down or shift-up of the change gear (speed-change shift), etc. after the rear column member 5 has returned to within the normal on-driving tilt adjustable range (approximately ±10 degrees), as shown in FIG. 4, a pin 25a of a solenoid (a tilt adjusting lever locking means) 25 provided on the rear column member 5 enters a lock hole 12b of the tilt adjusting lever 12, thereby locking the tilt adjusting lever 12.

The rear column member 5 can be thereby prevented from being tilted up when other than parking of the vehicle, e.g., during the traveling.

The apparatus being configured as described above, as shown in FIG. 3, if the rear column member 5 is tilted up through a larger angle (e.g., 50 degrees) in access of the on-driving tilt adjustable range (approximately ±10 degrees) during the parking of the vehicle, and if capable of confirming that the speed-change shift is set in, e.g., the parking range (P), the pin 25a of the solenoid 25 moves back from the lock hole 12b of the tilt adjusting lever 12, thereby unlocking the tilt adjusting lever 12.

The wedge-shaped member 10 is retreated backwards by swaying the tilt adjusting lever 12 backwards of the vehicle while resisting the biasing force of the press spring (the compression spring) 11, and the movable gear 8 is rotated counterclockwise and is thus disengaged from the fixed gear 6, thereby releasing the rear column member 5 from being fixed to the tilt position.

Subsequently, the rear column member 5 is tilted up through a large angle (e.g., 50 degrees) while holding the tilt adjusting lever 12 in the tilt-fixation-released state. On this occasion, during a period till the completion of the tilt-up of the rear column member 5 since the tilt-up thereof has been started, the movable gear 8 moves while the gear teeth portion 8a thereof slides on the non-teeth area 6b of the fixed gear 6.

Thereafter, upon the completion of the large angle tilt-up, the movable gear 8 operates so that the gear teeth portion 8a thereof is separated from the non-teeth area 6a by the biasing force of the press spring 11, and the side end surface 8c thereof is engaged with the side end surface 6c of the fixed gear 6 and thus locked. Accordingly, the steering wheel (not shown) fixedly provided at the rear side end of the rear steering shaft 2 can be surely held unmovable in that position even if a large load is applied such as the driver's hanging on to the steering wheel and so forth.

When the large angle tilt-up is completed, the large angle tilt-up sensor 24 detects that the front side end support seat portion (the tilt-up stopper) 22 of the rear column member 5 abuts on the rear side end support seat portion (the tilt-up stopper) 21 of the front column member 4. With this contrivance, the speed-change shift is locked at the parking range (P), thereby making the vehicle unable to travel.

The second support spring (the tension spring) 23, only when the rear column member 5 is tilted up through the large angle, offsets the center line thereof from the tilt center and elastically pulls the rear column member 5 (counterclockwise, i.e., in the direction of raising the rear column member 5) and can thus hold the same member 5. Hence, the steering wheel, when tilted up through the large angle, can be surely held in this tilt-up position.

In the case of returning the rear column member 5 to within the on-driving tilt adjustable range (approximately ±10 degrees) from the large angle tilt-up state, the tilt adjusting lever 12 is swayed backwards (FIG. 2) of the vehicle with a resistance against the biasing force of the press spring (the compression spring) 11, and the movable gear 8 is assisted by the biasing force of the press spring 11 and thus rotated counterclockwise in FIG. 3, thereby unlocking the side end surface 8c of the movable gear 8 and the side end surface 6c of the fixed gear 6 from each other. In this state, the rear column member 5 is returned and is, after making the tilt adjustment within the on-driving tilt adjustable range (approximately ±10 degrees), fixed to the tilt adjusted position by fastening.

Thereafter, in the case of detecting the vehicle travelable state such as the release from the parking brake, the shift-down or shift-up of the change gear (speed-change shift), etc., the pin 25a of the solenoid 25 provided on the rear column member 5 enters the lock hole 12b of the tilt adjusting lever 12, thereby locking the tilt adjusting lever 12. The rear column member 5 can be thereby prevented from being tilted up when other than parking.

(Second Embodiment)

Figure 5:
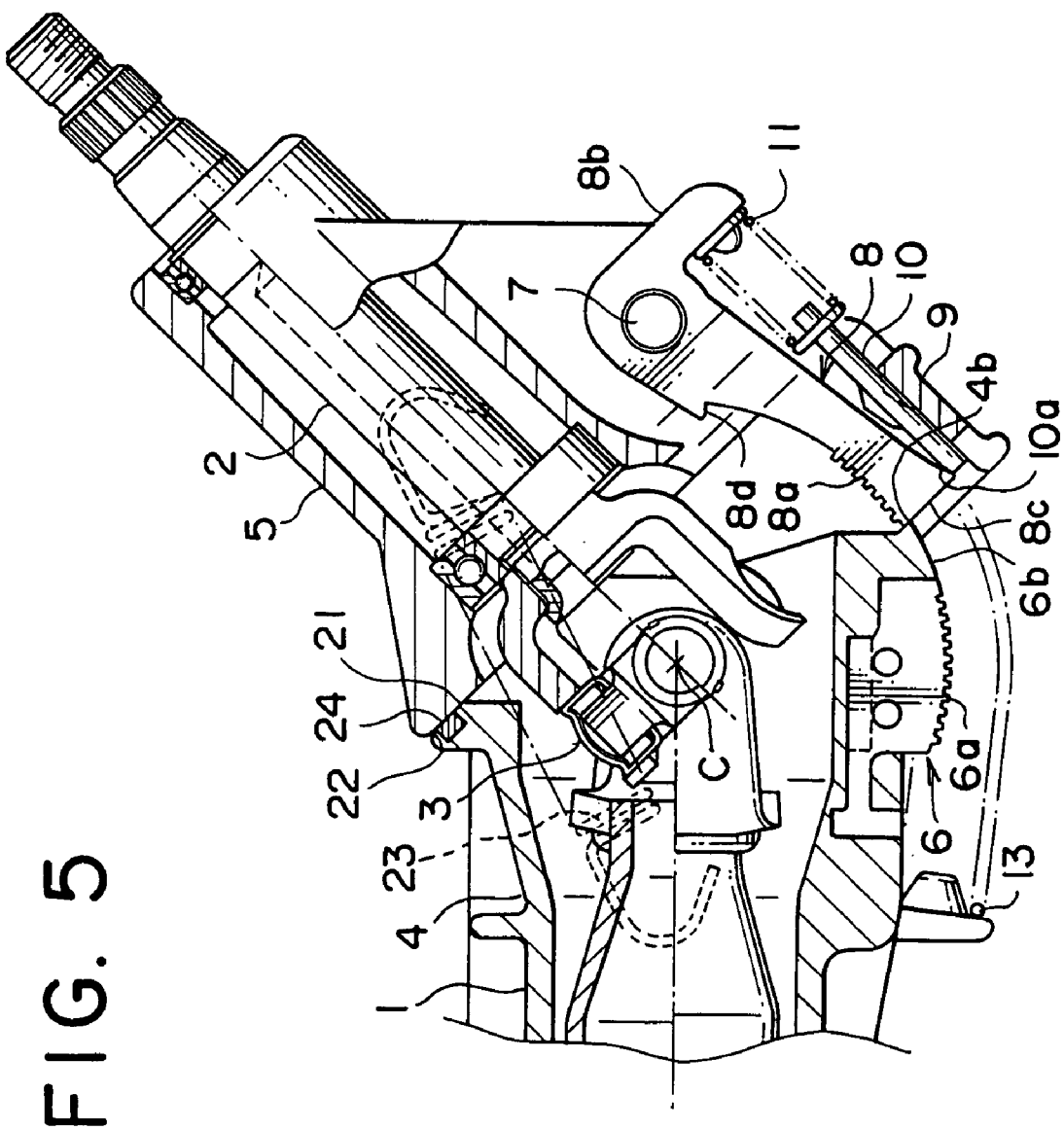
FIG. 5 is a vertical sectional view of the tilt adjustable type steering apparatus for the vehicle of a second embodiment of the present invention, showing a state where the rear column member is tilted up through the large angle in excess of the on-driving tilt adjustable range.

FIG. 5 is a vertical sectional view of the tilt adjustable type steering apparatus for the vehicle of a second embodiment of the present invention, showing a state where the rear column member is tilted up through a large angle exceeding the on-driving tilt adjustable range.

According to the first embodiment discussed above, the rear portion of the fixed gear 6 protrudes backwards of the front column member 4. By contrast, according to the second embodiment, the rear portion of the front column member 4 protrudes more backwards than in the first embodiment, and this rear side edge (the side end portion) 4b is obliquely formed so that the side end surface (the side end portion) 8c of the movable gear 8 can engage therewith.

Accordingly, when tilting the rear column member 5 up through a large angle (e.g., 50 degrees) while holding the tilt adjusting lever 12 in the tilt-released state, during a period till the completion of the tilt-up of the rear column member 5 since the tilt-up thereof has been started, the movable gear 8 moves while the gear teeth portion 8a thereof slides on the non-teeth area 6b of the fixed gear 6.

Thereafter, upon the completion of the large angle tilt-up, the movable gear 8 operates so that the gear teeth portion 8a thereof is separated from the non-teeth area 6a by the biasing force of the press spring 11, and the side end surface (the side end portion) 8c thereof is engaged with the rear side edge (the side end portion) 4b of the front column member 4 and thus locked. Accordingly, the steering wheel can be surely held unmovable in that position even if there is applied a load that is as large as the driver's hanging on to the steering wheel and so forth.

Further, in the second embodiment, an impact absorbing member 30 may be disposed in the rear side end support seat portion 21 of the front column member 4 to absorb an impact, etc. caused when the front side end support seat portion (the tilt-up stopper) 22 of the rear column member 5 abuts on the rear side end support seat portion (the tilt-up stopper) 21 of the front column member 4. In this case, the impact absorbing member 30 can prevent a noise of abutment between the two stoppers 21, 22. Note that other configurations and operations are the same as those in the first embodiment discussed above.

(A Third Embodiment)

Figure 6:
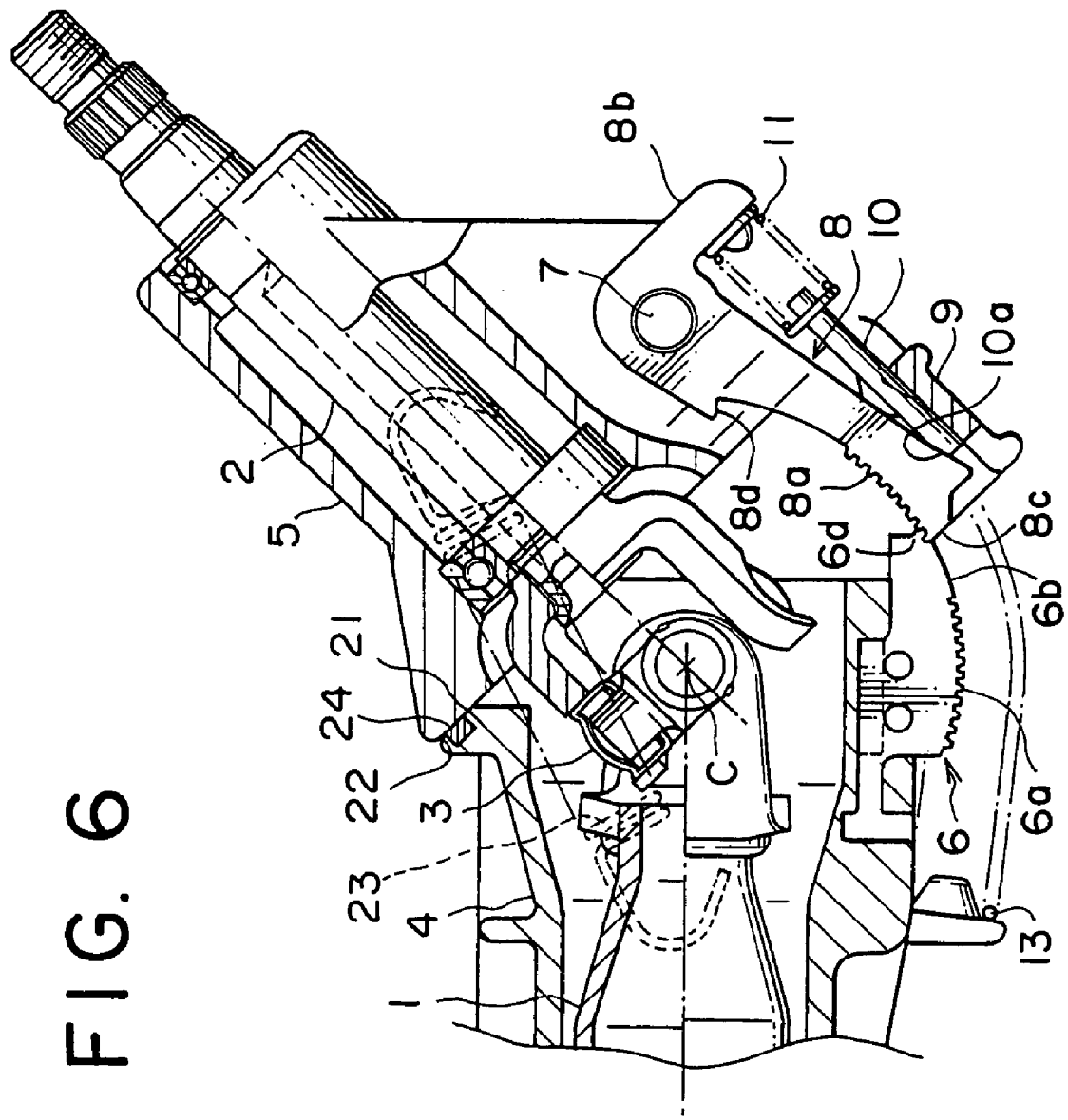
FIG. 6 is a vertical sectional view of the tilt adjustable type steering apparatus for the vehicle of a third embodiment of the present invention, showing a state where the rear column member is tilted up through the large angle in excess of the on-driving tilt adjustable range.

FIG. 6 is a vertical sectional view of the tilt adjustable type steering apparatus for the vehicle of a third embodiment of the present invention, showing a state where the rear column member is tilted up through a large angle exceeding the on-driving tilt adjustable range.

According to the first embodiment discussed above, when tilted up through the large angle, the front side end surface 8c of the movable gear 8 engages with the rear side edge 6c of the fixed gear 6. By contrast, according to the third embodiment, the rear side end portion 6d of the non-teeth area 6b of the fixed gear 6 is formed with one or two pieces of teeth, wherein one or two pieces of teeth of the front side end portion of the movable gear 8 mesh with the rear side end portion 6d of the fixed gear 6 when tilted up through the large angle.

Accordingly, when tilting the rear column member 5 up through a large angle (e.g., 50 degrees) while holding the tilt adjusting lever 12 in the tilt-released state, during a period till the completion of the tilt-up of the rear column member 5 since the tilt-up thereof has been started, the movable gear 8 moves while the gear teeth portion 8a thereof slides on the non-teeth area 6b of the fixed gear 6.

Thereafter, upon the completion of the large angle tilt-up, the movable gear 8 operates so that one or two pieces of teeth of the front side end portion mesh with one or two pieces of teeth of the rear side end portion 6d of the non-teeth area 6b of the fixed gear 6 and are thus locked. Hence, the steering wheel can be surely held unmovable in that position even if the driver, etc. hangs on to the steering wheel.

Further, in the third embodiment, an impact absorbing member 30 is disposed in the rear side end support seat portion 21 of the front column member 4 to absorb an impact etc, caused when the front side end support seat portion (the tilt-up stopper) 22 of the rear column member 5 abuts on the rear side end support seat portion (the tilt-up stopper) 21 of the front column member 4. In this case, the impact absorbing member 30 can prevent the noise of abutment between the two stoppers 21, 22. Note that other configurations and operations are the same as those in the first embodiment discussed above.

The present invention is not limited to the embodiments discussed above and can be modified in a variety of forms. For instance, the present invention has exemplified the case where the steering wheel is tilted up through the large angle in the tilt type, and can be also applied to a case where the steering wheel is tilted up through the large angle in a tilt/telescopic type. Moreover, the fixed gear may be fitted to the rear column member, and the movable gear may be fitted to the front column member.

As discussed above, according to the first mode of the present invention, the large angle tilt-up tension spring for elastically pulling the rear column member when tilting the rear column member up through the large angle in excess of the on-driving tilt adjustable range, is interposed between the front column member and the rear column member. This tension spring is disposed so that, when the rear column member is set in the neutral position of the on-driving tilt adjustable range, the center line of the tension spring is substantially parallel with the axial line of the steering shaft and extends through the tilt center or sideways of the vicinity thereof. Therefore, the large angle tilt-up tension spring does not exhibit the elastic tension force in the normal on-driving tilt adjustable range and, only when tilted up through the large angle, offsets the center line thereof from the tilt center, and elastically pulls the rear column member thereby retaining this rear column member. Accordingly, the steering wheel, when tilted up through the large angle, can be surely held in that position.

As discussed above, according to the second mode of the present invention, when the rear column member is tilted up through the large angle, the movable gear operates so that its side end surface is engaged with the side end surface of the fixed gear and thus locked. Therefore, the steering wheel can be surely held unmovable in that position even if there is applied a load that is as large as the driver's hanging on to the steering wheel and so forth.

What is claimed is:

1. In a tilt adjustable type steering apparatus for a vehicle, constructed such that a rear column member is connected in a swayable manner within an on-driving tilt adjustable range to a front column member fixed to a car body, a fixed gear provided on one of said front column member and said rear column member is engaged with a movable gear provided on the other of said front column member and said rear column member when said rear column member is fixed to a tilt adjusted position, and said two fixed and movable gears are disengaged from each other by swaying said movable gear when said rear column member is released from the tilt adjusted position,
the improvement characterized in that a tension spring is provided which elastically pulls said rear column member when said rear column member is tilted up through a large angle in excess of the on-driving tilt adjustable range, and said tension spring is interposed between said front column member and said rear column member.

2. A tilt adjustable type steering apparatus for a vehicle according to claim 1, wherein said tension spring is disposed so that a center line of said tension spring extends through a tilt center or through the vicinity thereof as viewed from a side of the steering apparatus when said rear column member is set in a neutral position of the on-driving tilt adjustable range.

3. In a tilt adjustable type steering apparatus for a vehicle, constructed such that a rear column member is connected in a swayable manner within an on-driving tilt adjustable range to a front column member fixed to a car body, a fixed gear provided on one of said front column member and said rear column member is engaged with a movable gear provided on the other of said front column member and said rear column member when said rear column member is fixed to a tilt adjusted position, and said two fixed and movable gears are disengaged from each other by swaying said movable gear when said rear column member is released from the tilt position,
the improvement characterized in that said movable gear operates so that its front side end portion is engaged with a side end portion or said column member provided with said fixed gear or with a side end portion of said fixed gear and thus locked when said rear column member is tilted up through a large angle in excess of the on-driving tilt adjustable range.

4. A tilt adjustable type steering apparatus for a vehicle according to claim 3, wherein a joint that connects said rear column member to said front column member in a swayable manner about the tilt center, enables said rear column member to bend at a an angle in excess of the on-driving tilt adjustable range.

5. A tilt adjustable type steering apparatus for a vehicle according to claim 3, wherein a locking means, when said rear column member is tilted up through an angle in excess of the on-driving tilt adjustable range, holds said rear column member in said tilt-up position.

6. A tilt adjustable type steering apparatus for a vehicle according to claim 4, wherein a locking means, when said rear column member is tilted up through an angle in excess of the on-driving tilt adjustable range, holds said rear column member in said tilt-up position.

7. A tilt adjustable type steering apparatus for a vehicle according to claim 3, wherein said fixed gear and said movable gear respectively have teeth portions meshing with each other in the on-driving tilt adjustable range, and
said fixed gear has a non-teeth area formed with no tooth, adjacent to the teeth portion thereof.

8. A tilt adjustable type steering apparatus for a vehicle according to claim 7, wherein a joint that connects said rear column member to said front column member in a swayable manner about the tilt center, enables said rear column member to bend at an angle in excess of the on-driving tilt adjustable range.

9. A tilt adjustable type steering apparatus for a vehicle according to claim 8, wherein a locking means, when said rear column member is tilted up through an angle in excess of the on-driving tilt adjustable range, holds said rear column member in said tilt-up position.

10. A tilt adjustable type steering apparatus for a vehicle according to claim 7, wherein a locking means, when said rear column member is tilted up through an in excess of the on-driving tilt adjustable range, holds said rear column member in said tilt-up position.

11. In a tilt adjustable type steering apparatus for a vehicle, constructed such that a rear column member is connected in a swayable manner within an on-driving tilt adjustable range to a front column member fixed to a car body, a fixed gear provided on one of said front column member and said rear column member is engaged with a movable gear provided on the other of said front column member and said rear column member when said rear column member is fixed to a tilt adjusted position, and said two fixed and movable gears are disengaged from each other by swaying said movable gear when said rear column member is released from the tilt adjusted position,
the improvement characterized in that means for enabling said rear column member to be tilted up to an upper predetermined position in excess of the on-driving tilt adjustable range and means for holding said rear column member in the same predetermined position, are provided between said front column member and said rear column member.

12. In a tilt adjustable type steering apparatus for a vehicle, constructed such that a rear column member is connected in a swayable manner within an on-driving tilt adjustable range to a front column member fixed to a car body, a fixed gear provided on one of said front column member and said rear column member is engaged with a movable gear provided on the other of said front column member and said rear column member when said rear column member is fixed to a tilt adjusted position, and said two fixed and movable gears are disengaged from each other by swaying said movable gear when said rear column member is released from the tilt position, the improvement characterized in that means for enabling said rear column member to be tilted up to an upper predetermined position in excess of the on-driving tilt adjustable range and means for locking rear column member in the same predetermined position, are provided between said front column member and said rear column member.

13. In a tilt adjustable type steering apparatus for a vehicle, constructed such that a rear column member is connected in a swayable manner within an on-driving tilt adjustable range to a front column member fixed to a car body, a fixed gear provided on one of said front column member and said rear column member is engaged with a movable gear provided on the other of said front column member and said rear column member when said rear column member is fixed to a tilt adjusted position, and said two fixed and movable gears are disengaged from each other by swaying said movable gear when said rear column member is released from the tilt position, the improvement characterized by comprising biasing means for tilting said rear column member up to an upper predetermined position in excess of the on-driving tilt adjustable range.

* * * * *